US006795413B1

(12) United States Patent
Uhlik

(10) Patent No.: US 6,795,413 B1
(45) Date of Patent: Sep. 21, 2004

(54) RADIO COMMUNICATIONS SYSTEM IN WHICH TRAFFIC IS TRANSMITTED ON THE BROADCAST CHANNEL

(75) Inventor: Christopher Richard Uhlik, Danville, CA (US)

(73) Assignee: ArrayComm, Inc., San Jose, CA (US)

( * ) Notice: Subject to any disclaimer, the term of this patent is extended or adjusted under 35 U.S.C. 154(b) by 744 days.

(21) Appl. No.: 09/677,027

(22) Filed: Sep. 29, 2000

(51) Int. Cl.[7] .............................................. H04Q 7/00
(52) U.S. Cl. ...................... 370/330; 370/478; 375/132
(58) Field of Search ................................ 370/330, 328, 370/329, 335, 343, 336, 337, 338, 340, 341, 342, 229, 230, 231, 235, 345, 478, 442, 480; 375/132–137

(56) References Cited

U.S. PATENT DOCUMENTS

| 5,546,384 A | * | 8/1996 | Dupuy et al. ................ 370/330 |
| 5,898,929 A | * | 4/1999 | Haartsen ..................... 455/462 |
| 6,496,532 B1 | * | 12/2002 | Raitola et al. ............... 375/132 |
| 6,581,176 B1 | * | 6/2003 | Seo ............................. 714/749 |
| 6,639,908 B1 | * | 10/2003 | Silventoinen et al. ....... 370/345 |

* cited by examiner

Primary Examiner—Brian Nguyen
(74) Attorney, Agent, or Firm—Blakely, Sokoloff, Taylor & Zafman LLP

(57) ABSTRACT

In one embodiment, the present invention comprises broadcasting a broadcast burst in a broadcast channel from a base station. The broadcast channel has at least one assigned frequency and a plurality of time slots, at least one time slot being assigned for the broadcast burst. The invention further comprises transmitting traffic in a traffic channel from the base station. The traffic channel has a timed frequency hopping scheme, the hopped frequencies including the at least one broadcast channel frequency so that the traffic channel collides with the broadcast burst time slot. The invention further comprises broadcasting the broadcast burst in the traffic channel from the base station when the traffic channel collides with the broadcast channel, receiving a request for retransmission of traffic after the broadcast burst is broadcasted in the traffic channel due to a collision, and retransmitting the traffic in the traffic channel in response to the retransmission request.

34 Claims, 7 Drawing Sheets

|  | Base Station |  | Remote Terminal |
|---|---|---|---|
| 300 | Acquire GPS Timing |  |  |
| 302 | Determine BCH Slot Time |  |  |
| 304 |  | BCH → |  |
| 306 |  |  | Scan BCH Channels |
| 308 |  |  | Acquire Frame Timine |
| 310 |  |  | Acquire Synchronization |
| 312 |  |  | Build CR Using UTID And Transmit Power |
| 314 |  |  |  |
| 316 |  |  |  |
| 318 |  |  |  |
| 320 |  | ← Configuration Request |  |
| 322 | Unscamble CR Using BSCC |  |  |
| 324 | Determine Spatial Signature Of Remote CR |  |  |
| 326 |  | Configuration Massage → |  |
| 328 |  |  | Adjust Timing And Power |
| 330 |  | ← Traffic Request |  |
| 332 |  | Traffic Assignment → |  |
| 334 |  | ← Traffic → |  |
| 336 |  | Send Packet → |  |
| 338 |  | ← Send DA And Packet |  |
| 340 |  | Send DA And Packet → |  |
| 342 |  | ← Send DA And Packet |  |

Fig. 8

RADIO COMMUNICATIONS SYSTEM IN WHICH TRAFFIC IS TRANSMITTED ON THE BROADCAST CHANNEL

BACKGROUND OF THE INVENTION

1. Field of the Invention

The present invention applies to radio communications systems in which several remote terminals communicate voice or data with a base station and, in particular, to such a system in which the base stations uses a broadcast channel that is also used to transmit voice or date to specific remote terminals.

2. Description of the Prior Art

Mobile radio communications systems such as cellular voice radio systems typically have a base station available for use by mobile remote terminals, such as cellular telephones or wireless web devices. The base station typically transmits a broadcast channel (BCH). The BCH is broadcast to all remote terminals whether they are registered on the network or not and informs the remote terminals about the network. In order to access the network, a remote terminal must normally tune to and listen to the BCH before accessing the network. A remote terminal will typically scan a range of likely frequencies when it wants to access the network until it finds the strongest BCH. It will then use the information transmitted or broadcast in the BCH to access the network.

The BCH typically carries as much data as a typical traffic channel. However, because it is necessary in order to permit remote terminals to access the network, the BCH is reserved exclusively for broadcast network data.

The present invention allows the broadcast channel to be used, in part, for carrying traffic. This allows less of the channel resources to be dedicated to the broadcast channel and more of the channel resources to be dedicated to traffic. In one embodiment, traffic is transmitted during a significant portion of the broadcast channel. When a broadcast burst supercedes traffic messages, the superceded traffic message is transmitted in the next traffic channel slot.

BRIEF SUMMARY OF THE INVENTION

In one embodiment, the present invention comprises broadcasting a broadcast burst in a broadcast channel from a base station. The broadcast channel has at least one assigned frequency and a plurality of time slots, at least one time slot being assigned for the broadcast burst. The invention further comprises transmitting traffic in a traffic channel from the base station. The traffic channel has a timed frequency hopping scheme, the hopped frequencies including the at least one broadcast channel frequency so that the traffic channel collides with the broadcast burst time slot. The invention further comprises broadcasting the broadcast burst in the traffic channel from the base station when the traffic channel collides with the broadcast channel, receiving a request for retransmission of traffic after the broadcast burst is broadcasted in the traffic channel due to a collision, and retransmitting the traffic in the traffic channel in response to the retransmission request.

BRIEF DESCRIPTION OF THE DRAWINGS

The present invention is illustrated by way of example, and not by way of limitation, in the figures of the accompanying drawings in which like reference numerals refer to similar elements and in which:

FIG. 8 is a diagram illustrating a communications sequence according to one embodiment of the present invention.

DETAILED DESCRIPTION OF THE INVENTION

Basic Structure

Figure 1:
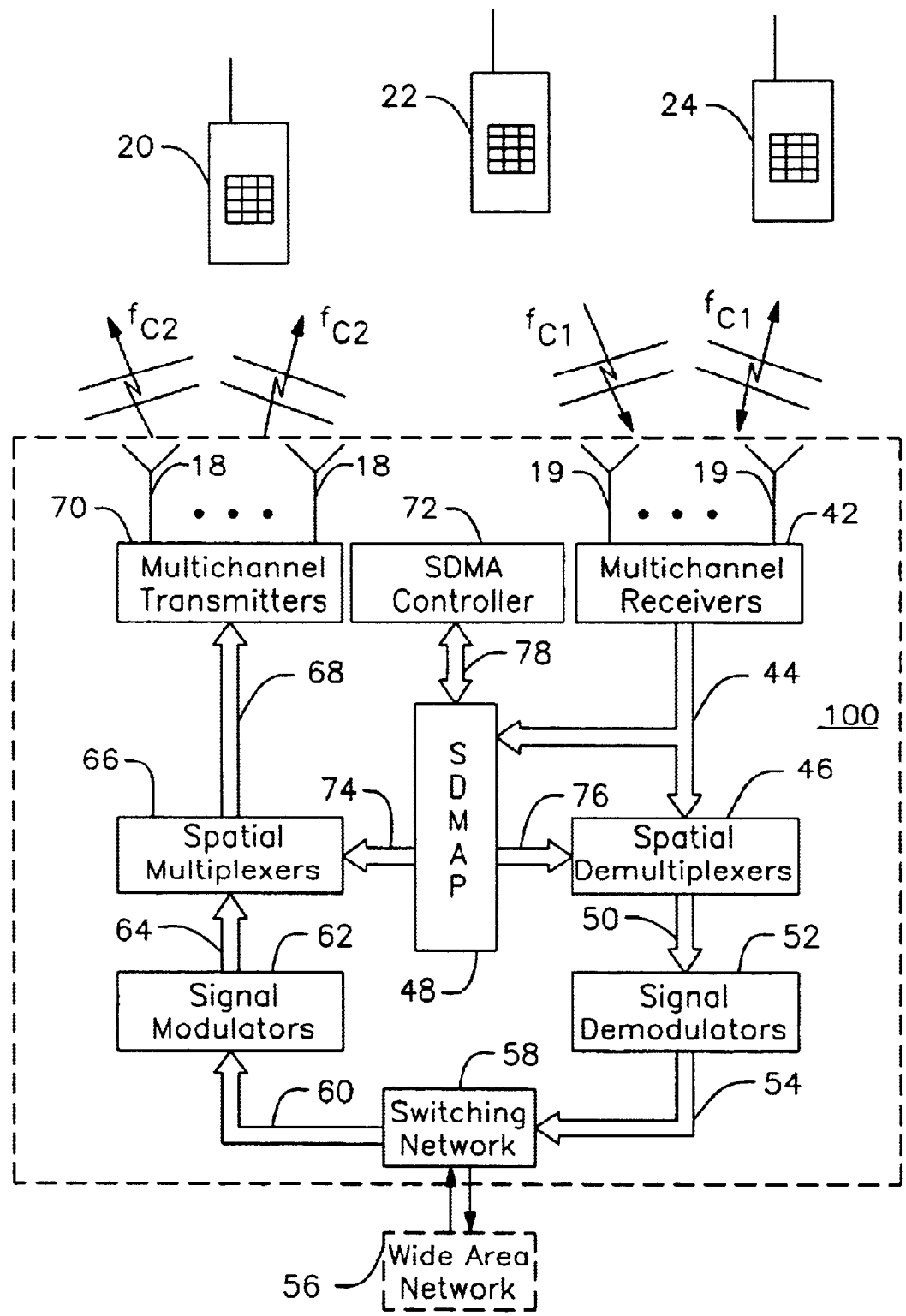
FIG. 1 is a diagram illustrating an exemplary architecture of a wireless communication system according to one embodiment of the present invention.
Figure 2:
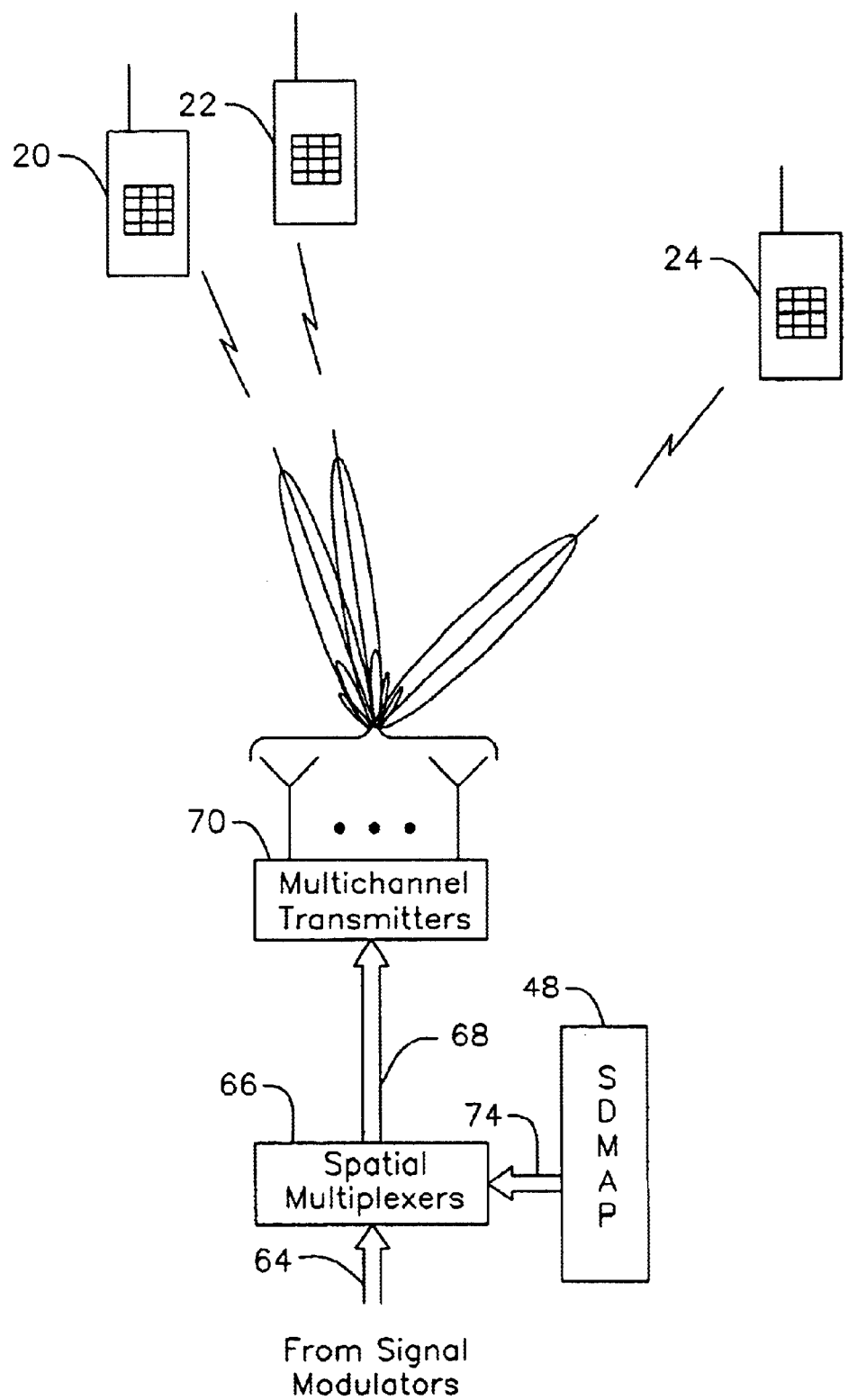
FIG. 2 is a diagram illustrating transmission patterns of a multi-channel spatial diversity transmitter according to one embodiment of the present invention.

FIG. 1 shows an example of a wireless communications system or network in which a number of subscriber stations, also referred to as remote terminals or user terminals, (symbolically shown as handsets) 20, 22, 24, are being served by a base station 100 that may be connected to a wide area network (WAN) 56 for providing any required data services and connections external to the immediate wireless system. The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). A switching network 58 interfaces with a WAN 56 for providing multi-channel duplex operation with the WAN by switching incoming WAN data to lines 60 of the base station 100 and switching outgoing signals from the base station 100, on lines 54 to the WAN. Incoming lines 60 are applied to signal modulators 62 that produce modulated signals 64 for each subscriber station to which the base station is transmitting. A set of spatial multiplexing weights for each subscriber station are applied 74 to the respective modulated signals in spatial multiplexers 66 to produce spatially multiplexed signals 68 to be transmitted by a bank of multi-channel transmitters 70 using a transmit antenna array 18. The SDMA processor (SDMAP) 48 produces and maintains spatial signatures for each subscriber station for each conventional channel, calculates spatial multiplexing and demultiplexing weights for use by spatial multiplexers 66, and spatial demultiplexers 46, and uses the received signal measurements 44 to select a channel for a new connection. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. An example of a transmit antenna pattern that may be created is shown in FIG. 2. Suitable technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al.

Returning to FIG. 1 spatial demultiplexers 46 combine received signal measurements 44 from the multi-channel receivers 42 and associated antenna array 19 according to spatial demultiplexing weights 76, a separate set of demultiplexing weights being applied for each subscriber station communicating with the base station. The outputs of the spatial demultiplexers 46 are spatially separated signals 50 for each subscriber station communicating with the base station. In an alternate embodiment, the demultiplexing and demodulation processing are performed together in a nonlinear multidimensional signal processing unit. The demodulated received signals 54 are then available to the switching network 58 and the WAN 56. The multi-channel receivers also receive timing signals from GPS (Global Positioning System) satellites or some other radio precision timing signal which is then provided to the SDMAP for precise timing that is synchronized across all base stations in the system.

In an FDMA system implementation, each multi-channel receiver and each multi-channel transmitter is capable of handling multiple frequency channels. In other embodiments, the multi-channel receivers 42 and multi-channel transmitters 70 may instead handle multiple time slots, as in a TDMA system, multiple codes, as in a CDMA system, or some combination of these well-known multiple access techniques.

Figure 3:
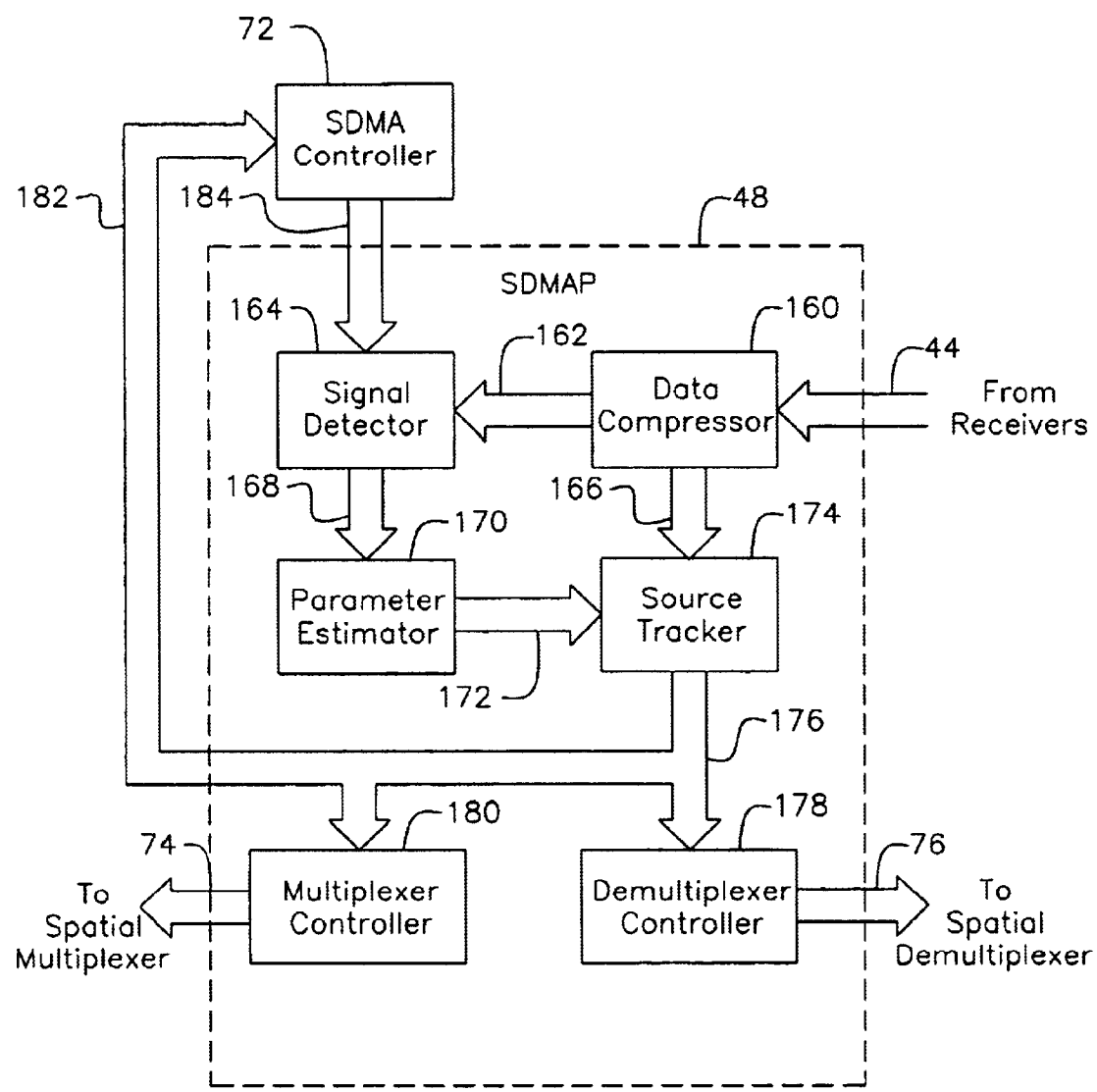
FIG. 3 is a block diagram illustrating a spatial diversity multiple access processor according to one embodiment of the present invention.

FIG. 3 shows a breakdown of a Spatial Division Multiple Access signal Processor (SDMAP) 48. The function of the SDMAP includes determining how many signals are present in a particular channel, estimating signal parameters such as the spatial location of the transmitters (i.e., directions-of-arrival (DOAs) and distance from the base station), and determining the appropriate spatial demultiplexing and multiplexing schemes. The inputs 44 to the SDMAP include outputs of base station receivers, one for each receiving antenna. In one embodiment, the receivers perform quadrature detection of the signals as in current systems, in which case there are in-phase (I) and quadrature (Q) components (signals) output from each channel behind each antenna. In another embodiment, a single down-converted component, I or Q or any combination thereof, is used. In one embodiment, the receivers digitize the data before passing it to the SDMAP. In another embodiment, digitization is performed in the data compressor 160.

In one embodiment of the invention, the SDMAP accomplishes its task by first obtaining estimates of important signal related parameters such as their directions-of-arrival (DOAs) without exploiting temporal properties of the signal. This is appropriate, for example, in situations where analog modulation schemes are employed and little is known about the signal waveform. In a second embodiment, known training sequences placed in digital data streams for the purpose of channel equalization can be used in conjunction with sensor array information to calculate signal parameter estimates such as DOAs and signal power levels. This information is then used to calculate appropriate weights 76 for a spatial demultiplexer, implemented in this embodiment as a linear combiner, i.e., a weight-and-sum operation. In a third embodiment, time-of-arrival (TOA)-related parameters from the parameter estimator are used in conjunction with signal correlation parameters to ascertain which signals are multi-path versions of a common signal. Relative delays are then calculated such that the signals can be coherently combined, thus further increasing the quality of the estimated signals.

However, in another embodiment of this invention, the function of the spatial demultiplexer is performed in conjunction with the estimation of other source parameters such as the DOAs. As an example of one such embodiment of this type, the constant modulus property (i.e., constant amplitude) of various communication signals such as digital phase-shift-keyed (PSK) and analog FM waveforms can be exploited along with properties of the array of receiving antennas to simultaneously estimate the source waveforms as well as their DOAs using multi-channel constant-modulus algorithms (CMA) which are well-known in the art.

In another embodiment, extended Kalman filters, also well-known in the art, can be used to exploit these and similar properties. In these and similar embodiments, the function of the spatial demultiplexer 46 is assumed by the SDMAP 48, and the outputs 76 of the SDMAP are the spatially demultiplexed signals to be sent to the demodulators.

Referring again to FIG. 3, data compression 160 is performed to reduce the amount of data, and, in one embodiment, consists of accumulation of a sample covariance matrix involving sums of outer products of the sampled receiver outputs in a particular channel. Hereafter, these sampled outputs are referred to as data vectors, and there is one such data vector at each sample time for each of the channels assigned to a particular base station. In another embodiment, the compressed data are simply the unprocessed data vectors. If I and Q signals 44 are output from the receivers, each data vector is a collection of $m_r$ complex numbers, one for each of the $m_r$ receiver/antenna pairs.

In a third embodiment, data compression also includes using known signal information such as training sequences present in wireless digital systems and mobile unit transponder responses in current analog systems to calculate time-of-arrival (TOA) of a distinct periodic signal feature, a parameter containing valuable information related to the distance between cell sites and the wireless transmitter which is exploited in this embodiment.

Compressed data 162 are passed to a signal detector 164 for detection of the number of signals present in the channel. In one embodiment, statistical detection schemes are employed in conjunction with information from a SDMA controller 72 to estimate the number of sources present in the channel. This information and the (compressed) data 168 are sent to a parameter estimator 170 where estimates of signal parameters including those related to the source locations (e.g., DOAs and range) are obtained.

Location-related parameter estimates 172 are passed to a source tracker 174. In one embodiment, the function of the source tracker is to keep track of the positions of each of the transmitters as a function of time. This is implemented by known nonlinear filtering techniques such as the aforementioned extended Kalman filter (EKF). In another embodiment, velocities and accelerations of each of the wireless units in a particular channel are tracked as well. Inputs to the EKF in one embodiment include the DOAs and TOAs from the local base station. In another embodiment, DOA and TOA measurements from other nearby cell sites also receiving transmissions from the mobile units are incorporated along with known locations of the cell sites to further improve the estimation accuracy of the EKF as is well-known in the art. The tracker 174 outputs are sent along with the (compressed) data 176 to a spatial demultiplexer controller 178, to control the function of the spatial demultiplexer, and to a spatial multiplexer controller 180 to control the function of the spatial multiplexer.

Figure 4:
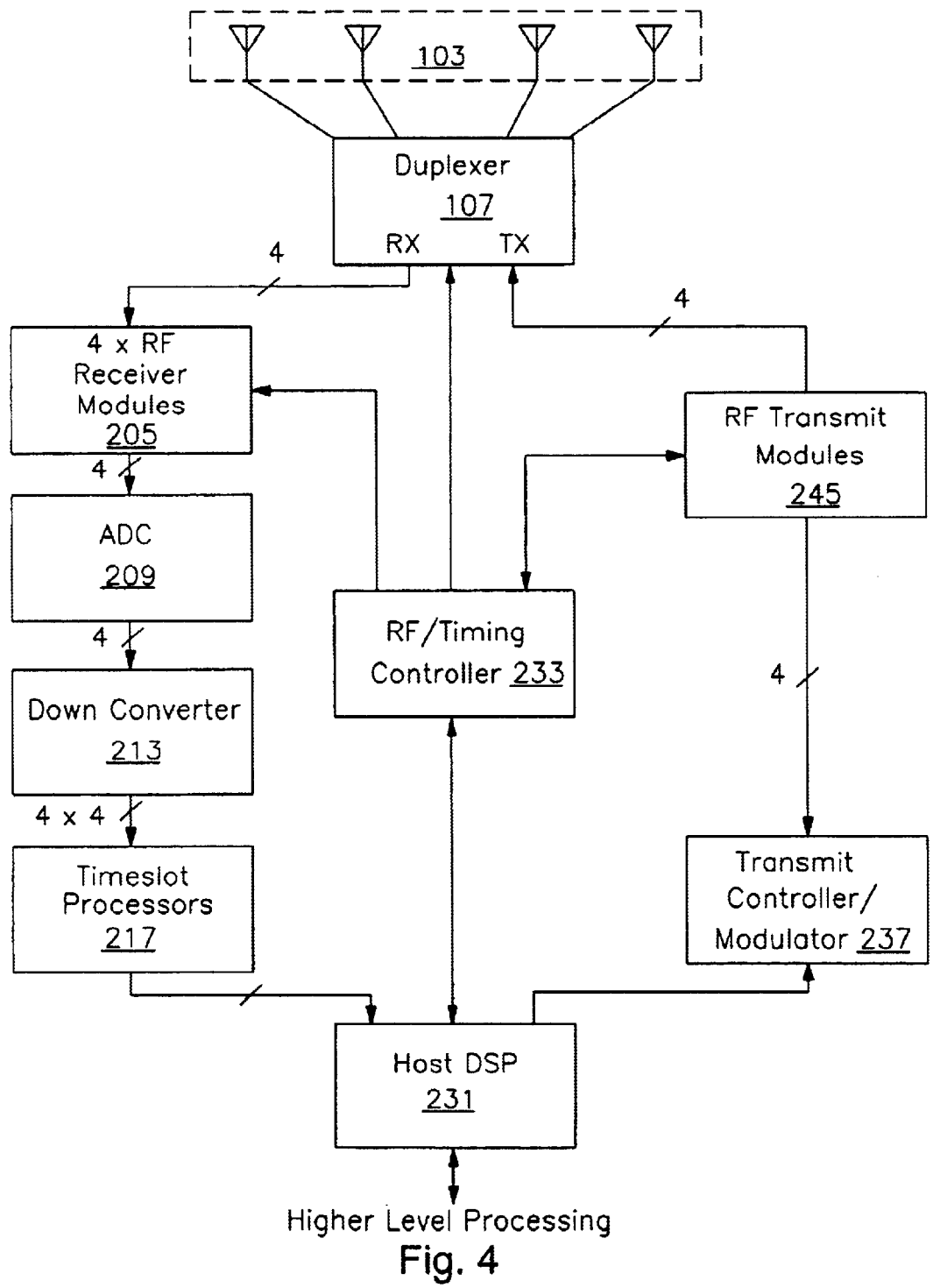
FIG. 4 shows a simplified block diagram of a base station on which an embodiment of the invention can be implemented.

FIG. 4 shows an alternative embodiment of a wireless communications system suitable for implementing the present invention. This system is typically coupled to a switching network and WAN similarly to the system of FIG. 1 such as switching network 58 and WAN 56. In FIG. 4, a plurality of antennas 103 is used, for example four antennas, although other numbers of antennas may be selected. The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency (for example around 1.9 GHz) to an FM intermediate frequency ("IF") of, for example, 384 kHz. This signal then is digitized (sampled) by analog to digital converters ("ADCs") 209 at, for example, 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 383 kHz complex phasor. The result is a complex valued signal that contains the complex valued baseband signal plus an image at, for example, $-2\times384=-768$ kHz. This unwanted negative frequency image is filtered digitally to produce the complex valued baseband signal sampled at 1.536 MHz. GrayChip Inc. GC2011 digital filters can be used to implement the down-converting and the digital filtering, the latter using finite impulse response (FIR) filtering techniques. This is shown as block 213. The particular frequencies suggested above are provided by way of example. The invention can be adapted to suit a wide variety of RF and IF. carrier frequencies and bands.

There are, in the present example, four down-converted outputs from each antenna's GC2011 digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot.

The timeslot processors 217 perform several functions including the following: received signal power monitoring; frequency offset estimation and time alignment; smart antenna processing including determining weights for each antenna element to determine a signal from a particular remote user; and demodulation of the determined signal.

The output of the timeslot processor 217 is demodulated burst data for each of the four receive timeslots. This data is sent to a host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights to the host DSP 231. The main functions of the host DSP 231 specifically include:

maintaining state and timing information;

receiving uplink burst data from the timeslot processors 217;

programming the timeslot processors 217;

processing the uplink signals, including de-encrypting, de-scrambling, error correcting code checking, and burst deconstruction of the uplink;

formatting the uplink signal to be sent for higher level processing in other parts of the base station;

formatting service data and traffic data for further higher processing in the base station;

receiving downlink messages and traffic data from the other parts of the base station;

processing of downlink bursts (burst construction, encoding, scrambling and encryption);

formatting and sending downlink bursts to a transmit controller/modulator, shown as 237;

programming the transmit controller/modulator 237, including determining and sending transmit weight vectors to the transmit controller/modulator 237;

controlling the RF controller shown as 233; and maintaining and reporting modem status information, and controlling synchronization.

The RF controller 233 interfaces with the RF system, shown as block 245 and also produces a number of timing signals that are used by both the RF system and the modem. The specific tasks performed by the RF controller 233 include:

producing timing signals for the RF system (RX and TX) and other parts of the modem;

reading transmit power monitoring values;

writing transmit power control values;

producing the duplexer 107 switch box control signal; and reading automatic gain control (AGC) values.

the RF controller 233 receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. The specific operations transmit controller/modulator 237 performs are:

converting data bits into a complex modulated signal;

up-converting to an IF frequency using, for example, a GrayChip 2011;

4-times over-sampling the IF signal;

multiplying this 4-times over-sampled complex signal by transmit weights obtained from host DSP 231; and converting the real part of the resulting complex valued waveforms via digital to analog converters ("DACs") which are part of transmit controller/modulator 237 to analog transmit waveforms which are sent to the transmit modules 245.

The transmit modules 245 up-convert the signals to the transmission frequency and amplify the signals. The amplified transmission signal outputs are sent to antennas 103 via the duplexer/time switch 107.

Broadcast Channel (BCH)

Figure 5:
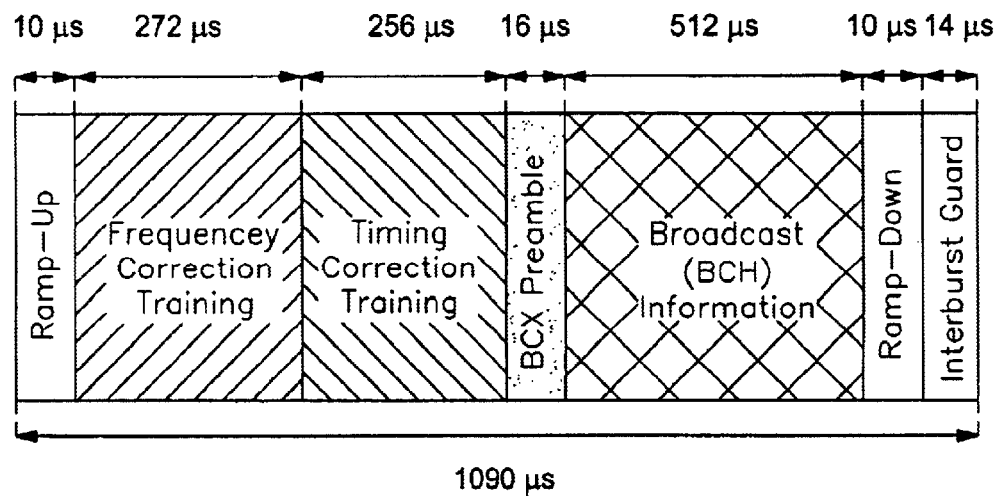
FIG. 5 is a diagram illustrating an example of a broadcast burst structure according to one embodiment of the present invention.

The system of the present invention is initiated for each user terminal or remote terminal from the broadcast channel BCH which is transmitted as a burst from the base station to all potential user terminals. The BCH burst, unlike the traffic channel bursts, is transmitted in all directions where user terminals may be, typically omnidirectionally but the specific beam pattern will depend on the network. Accordingly, the BCH burst will create more interference on the system than spatially directed or lower power traffic channels TCH. For this reason, the data and modulation properties of the BCH channel are selected to minimize interference. An example of a broadcast burst structure is shown in FIG. 5. Some of the important BCH burst properties are as follows. The BCH is computationally easy to find by scanning in real time having no knowledge of time-slot boundaries. It communicates enough basic information to enable a subsequent exchange of configuration request CR and configuration message CM between the base station and the user terminal. The BCH also provides good frequency offset and timing update information to all user terminals, even when the BCH is not specifically directed toward any one user terminal in particular.

Table 1, below summarizes the content of an example of a BCH burst, as shown in FIG. 5.

TABLE 1

| Duration | Contents |
|---|---|
| 10 μsec | ramp-up |
| 272 μsec | frequency correction training symbols $f_1, f_2, \ldots, f_{136}$ |
| 256 μsec | timing correction training symbols $t_1, t_2, \ldots t_{128}$ |
| 16 μsec | broadcast preamble $r_1, r_2, \ldots r_8$ |
| 512 μsec | information symbols $h'_1, h'_2, \ldots h'_{256}$ |
| 10 μsec | ramp - down |
| 14 μsec | inter-burst guard time |

The frequency and timing correction training symbols can be set according to any one of many approaches well-known in the art. They can also be combined, exchanged with a synchronization sequence or eliminated.

The broadcast information symbols are constructed from a 15-bit broadcast message which is modulated and coded into a 256 bit sequence. The number of symbols as well as the structure and sequence of transmitted bits can be varied to suit a wide variety of applications. The presently described embodiment has been selected in order to minimize the amount of information transmitted in the BCH as well as to minimize the bit rate. The broadcast channel information symbols provide the information needed for a user terminal to request a configuration message from the base station. They also provide information to guide user terminal handover decisions.

Each broadcast message is mapped into a broadcast burst with the information shown below in Table 2.

TABLE 2

| Broadcast Message | |
|---|---|
| Field | # of Bits |
| BStxPwr | 5 |
| BSCC | 7 |

TABLE 2-continued

| Broadcast Message | |
|---|---|
| Field | # of Bits |
| BSload | 3 |
| Total | 15 |

BStxPwr is the effective isotropic radiated power of the broadcast message. This number indicates the power transmitted by the base station taking into account the number of amplifiers and diversity antennas available at the base station. For a 10 antenna broadcast channel, base station power=(2·BStxPwr+10) dBm.

BSCC is the base station color code, used by the user terminal to select training data for uplink bursts and to distinguish broadcasts of different base stations. In one embodiment, there are up to 128 different possible color codes. The color codes can be used to indicate a base station in a different location or a different modulator/demodulator set in the same location.

BSload is the load on the base station, used by the user terminal to determine how frequently to send random access messages. BSload is an indication of the amount of unused capacity the base station has. It can be different from the number of active registered subscribers because subscribers can require different amounts of traffic capacity. BSload represents the transmit and receive bit rates of each modem of the base station over a period of a few minutes measured against maximum possible loading.

In one embodiment, the BCH channel is shared by all base stations in the wireless communication system. Using the 7 bit BSCC, up to 128 base stations can be accommodated. The BCH is a time division duplex channel with a repeating frame. The channel is a single RF carrier frequency used for uplink and downlink. For high noise environments or for increased robustness, the BCH can hop frequencies according to a predetermined scheme or be repeated on several different frequencies. The repeating frame includes the downlink BCH for each base station, labeled BS1 etc. as shown in Table 3 below. The next frame includes the uplink Configuration Request CR, labeled CR1 etc. and downlink Configuration Message CM, labeled CM1 etc. Each frame also includes a number of reserved slots, shown as empty boxes below. These slots can be used for data traffic, if the broadcast channel is also used for traffic, for other control messages or reserved to reduce interference on other channels in the network. The frames are repeated for each respective base station 1 to 128 to build a superframe as discussed in more detail below. After the last CM, CM128, the superframe repeats and begins again with the next superframe and the BCH for base station 1.

TABLE 3

| | Uplink | Downlink |
|---|---|---|
| Superframe 1 | | |
| Frame 1 | | BS1 |
| Frame 2 | CR1 | CM1 |
| Frame 3 | | BS2 |
| Frame 4 | CR2 | CM2 |
| . | . | . |
| . | . | . |
| . | . | . |
| Frame 255 | | BS128 |
| Frame 256 | CR128 | CM128 |

TABLE 3-continued

| | Uplink | Downlink |
|---|---|---|
| Superframe 2 | | |
| Frame 1 | | BS1 |
| Frame 2 | CR1 | CM1 |
| . | . | . |
| . | . | . |
| . | . | . |

A base station can be considered a collection of base station modems serving a group of contiguous RF carriers. Alternatively, a base station can be an installation with a set of modems at a single site. For other system configurations each modem modulator/demodulator set 52, 62 can be considered a base station. Each base station is assigned a unique 32-bit base station identifier, BSID. The BSID is used to derive a base station color code as follows: BSCC= BSID mod 128. As a function of the BSCC, a base station frequency hops, broadcasts BCH, listens for uplink CR, and sends downlink CM. Within a geographical region where radio transmissions overlap, the BSID should be assigned so that the BSCC is uniquely assigned. No base station should be able to routinely see user terminals that are communicating with a base station of the same color code. Likewise, no user terminal should be able to see two base stations that are assigned the same BSCC. The total number of base stations as well as the number of frames in a superframe, the number of slots in a frame and the particular slots used for transmitting BCH bursts, CRs and CMs can be modified to suit particular applications.

To minimize, the data rate of BCH bursts still further, the BSCC and BSload can be removed from the BCH burst. The BCH burst then contains only training or synchronization and BStxPwr, the only information directly related to handover decisions. The user terminal can still distinguish and compare different base stations for selection and handover decisions based on timing of the received BCH bursts. The user terminal can also direct its CR message to a specific base station as shown in Table 3 based on timing. For a single base station system, the BStxPwr bits can also be deleted. If there is only one base station, it is not necessary to evaluate path loss but only whether the signal can be received. The rest of the network information can be learned upon registration, described below. Alternatively, since the BCH includes the BSCC, the user terminal can be programmed to read the BSCC and assume that BCH bursts with a common BSCC are from the same base station. In this way, the user terminal can learn a shortened frame repetition interval, and reduce the time needed to register with the system.

Registration

A user terminal forms a relationship with a base station called a registration. This registration begins by listening to the broadcast channel and ends with a handover, timeout, or disconnection. The first step of registration is accomplished by a remote by sending the Configuration Request burst CR and receiving a Configuration Message burst CM. The CM contains basic configuration parameters such as hopping sequence calculation parameters. Using the information from the CM, the user terminal then opens an unauthenticated stream using a random access registration request RA-rreq. This unauthenticated stream carries only in-band signaling data used to complete registration and assignment of a registration identifier RID and paging identifier PID. Using the RID assigned at the end of the registration stream, the user terminal can open subsequent streams and it can end registrations. The user terminal can also open subsequent streams in which it can send packets which are used to perform "network login" to an Internet Service Provider (ISP).

During the registration stream, identities and capabilities are exchanged, operating parameters are set, and a RID and PID are assigned. Later, a new network session may be created and attached to this RID, or an existing session may be handed over. This handover may be from another base station, another base station modem on the same base station (load shifting), or even from a hibernating session on the same base station modem. The specific details of registration are provided here as examples only. Many other registration scenarios are also possible within the scope of the present invention.

Referring to FIG. 8, the frame timing is established by the base stations that are in the area and transmitting on a pre-programmed RF carrier. The carrier may be a frequency hopping or spread spectrum carrier. However, it is preferred that the carrier be easy to find and be pre-programmed into the user terminals. The base stations, or base station if there is only one, employ GPS or some other precise common timing reference to establish the frame timing 300. GPS timing offers the advantage that it is accurately synchronized and inexpensively available to all base stations. This allows the BCH to be shared by all the base stations with only a minimal guard time in the BCH between base stations. The base stations then build the BCH frame 302 described above and broadcast in their respective assigned slots 304. When a user terminal turns on, it scans this well-known, optionally pre-programmed, RF carrier 306 to find basic frame timing 308 and synchronization 310. The user terminal scans this carrier for BCH bursts, building an RSSI (Received Signal Strength Indicator) map 312. From this BCH RSSI map and other factors, the user terminal selects the strongest or the best base station 314. It also uses the BCH to precisely adjust its oscillator frequency and adjust its frame timing reference 308, 310. This is done using the synchronization and timing sequences in the BCH burst, described above. Then, using its user or remote terminal ID (UTID) it builds 316 and sends 320 a Configuration Request CR, timed relative to the BCH burst for that strongest or best base station. In one embodiment, the CR is scrambled using the BSCC that was received in the BCH from the selected base station 318.

If the intended base station successfully receives the CR and has available capacity, it unscrambles the CR 322, and determines the spatial signature of the user terminal 324. The user terminal receives a Configuration Message burst CM in reply 326. The CM, described in greater detail below, contains sufficient information for the user terminal to learn its distance and RF path-loss to the base station, correct its timing advance, adjust its power control, and learn the parameters of frequency hopping (e.g. frame numbering and BSCC) 328. Several base stations may be probed with a CR to find the closest or the best base station. Based on this information from the CM, the user terminal, when it has data to transmit, can start a session, beginning with a random access registration request RA-rreq 330. If resources are available, the base station sends an Access Assignment AA 332 to the user terminal assigning a traffic channel. The base station and user terminal exchange various access control parameters including encryption keys on this established stream. Finally a RID and PID are assigned. Using this RID, the user terminal can establish secure streams (e.g. RA-rts/ AA-cts) in which it transmits and receives internet packets 334.

The traffic channel includes a data acknowledgement DA or a data invalid DI response to each transmitted data packet. The DA and DI messages are transmitted as a part of the next data packet from the recipient in the next slot. In a time division duplex frame, the base station and the user terminal alternate slots 336, 338, 340, 342, as shown in FIG. 8. Accordingly, if any slots are not received properly, the data can quickly be retransmitted. This reduces the size of the data buffers at the respective base station and user terminal modems. As shown in Tables 3 and 4, uplink slots always precede downlink slots and there is a guard time between the two in order to allow for any synchronization errors or unanticipated propagation delays. In one embodiment, each side transmits data packets in three slots, each slot including ramp-up and ramp-down periods as well as synchronization bits as is well-known in the art.

TABLE 4

| 1 2 3 Uplink Slots | Guard Time | 1 2 3 Downlink Slots | Guard Time | 1 2 3 Uplink Slots | ... |
|---|---|---|---|---|---|

Periodically, the user terminal scans the BCH to update its RSSI and BSCC map. When it detects a better base station, it may send a CR to this new base station and possibly handover its network session. If successful stream initiation fails too many times, the user terminal enters a timeout state. From timeout, it may try to regain a RID via RA-rreq, refresh its timing advance using a CR, find a new base station to which it might handover by scanning the BCH, or even begin from scratch to re-acquire basic frame timing. If this re-establishment is successful, the user terminal may be able to continue its network session by completing a network session handover to the new base station.

Channel Considerations

In one embodiment, the network is designed to take maximal advantage of spatial division multiple access technologies and particularly smart antenna array signal processing. To help maintain reliable spatial channels in an extremely dense frequency reuse pattern, the network uses time division duplex TDMA where uplink and downlink transmissions are always on the same frequency. In addition because many user terminals are single antenna and transmit and receive omnidirectionally, except for the BCH, an uplink burst is always received before a downlink burst needs to be sent. This allows downlink bursts to be more accurately spatially directed. An uplink training sequence is embedded in every uplink burst to allow for moderately fast frequency hopping despite any decorrelation of the spatial channel with frequency.

The frequency hopping sequence may be any one of many different sequences well-known in the art. The parameters of the frequency hopping scheme are initially unknown to the user terminal. This maximizes the flexibility of the network and increases the flexibility of the user terminal. As explained below, the frequency hopping parameters are transmitted to the user in the CM burst.

The robustness of the frequency hopping scheme and the traffic capabilities of the system are improved if more frequency carriers can be allocated to the frequency hopping scheme. The BCH carrier is included as part of the frequency hopping scheme and, accordingly, used as a traffic channel. Since anyone base station transmits a BCH burst only once per frame and since traffic is spatially directed to a particular user, a base station can transmit traffic channel data bursts during another base station's BCH burst without significantly adding interference to user terminals that are listening for BCH bursts on neighboring channels. Normally, the user terminal to which the traffic data burst is directed will not be listening for BCH bursts because it is already in a traffic session.

Because in the present embodiment there are 128 base stations each assigned to a different slot of the BCH, it is unlikely that the $128^{th}$ portion of the BCH that is assigned to any one particular base station will overlap with a particular channel in the frequency hopping traffic channel scheme while that channel is being used for traffic. However, if it does, the base station broadcasts its BCH burst at its assigned time, listens for CR messages at its assigned time and transmits CM bursts in its assigned slot. This ensures further consistent operation of the network. For a user terminal, however, the use of the BCH carrier as a BCH will interrupt its traffic channel session. As a result, instead of receiving a data packet burst from the base station, it will receive the BCH burst. Even if the user terminal does not recognize this burst as BCH, it will immediately recognize it as having an invalid format for the expected data packet. Accordingly, in the next uplink frame, it will send a data invalid DI message with its burst and the base station will send the earlier expected data packet in the next available frame in the traffic channel. In the present timing scheme, the same slot in the next frame will coincide with a Configuration Message slot for that base station. The same slot in the next frame will coincide with a different base station's assigned BCH slot. However, even if the second slot also overlaps with the base station's BCH assignment, the same protocol can apply again. The remote terminal will again send a DI message and after the assigned BCH slot has passed, the base station will send the expected data burst. By relying on the acknowledgment protocol, the data capacity of the network can be increased to include most of the BCH without increasing the complexity of the signaling or processing resources.

The amount of data capacity increase will depend on how much of the RF resources are dedicated to the BCH and how many base stations are in the system. If there are a small number of base stations in the system, so that the BCH frame has a very short repeat, the network can be configured so that every BCH slot is used for BCH, greatly reducing the amount of time for a remote user to acquire timing and synchronization and transmit a configuration request. Alternatively, the BCH can be configured so that only a small number of the possible 128 slots are used for BCH bursts and the rest of the channel capacity is left open for traffic. If there are a large number (i.e. close to 128) of base stations in the network, then it is unlikely that a user terminal will be able to receive BCH bursts from more than ten percent of the possible base stations. As a result, the remaining ninety percent of the carrier can be used for data traffic without affecting new user terminals scanning for BCH bursts. The base station can be programmed with the BSID or BSCC of the nearby base stations so that it also will not transmit traffic during the BCH slots assigned to those base stations. The same DI, retransmit scheme described above will compensate for any conflicts between neighboring BCH slots and the traffic channel.

Configuration Request CR

Figure 6:
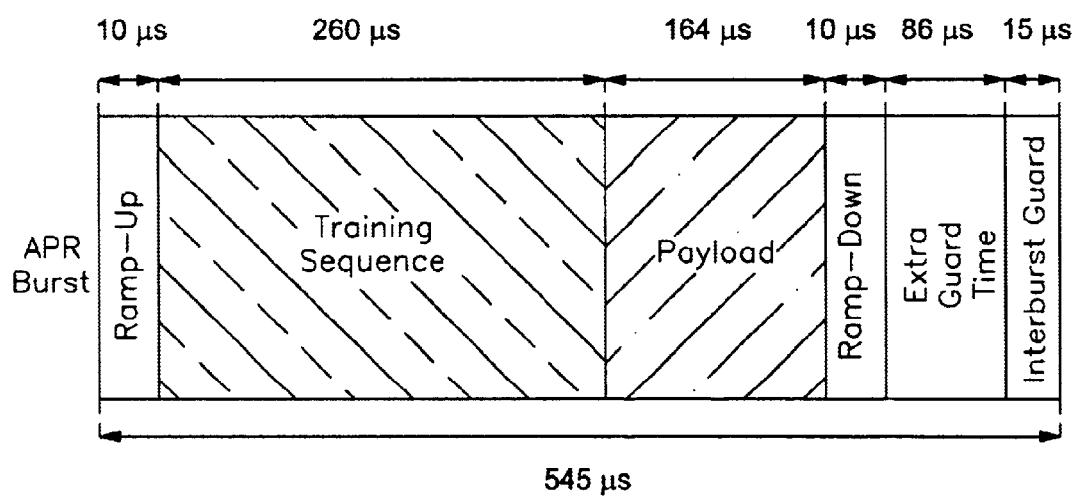
FIG. 6 is a diagram illustrating an example of a Configuration Request burst structure according to one embodiment of the present invention.

An example of a Configuration Request burst structure is shown in FIG. 6. CR bursts are distinguished from random access RA and traffic TCH bursts, in part, by a special CR spatial training sequence. The CR training sequence is longer than normal and has periodic properties that make finding timing alignment especially computationally efficient. The CR burst is shorter than a standard uplink data burst to allow for time-delay with unknown distance between the user terminal and base station. The CR burst is shortened by 86 μsec allowing an uncompensated time delay equivalent to a user terminal being about 15 km away from the base station.

The CR burst is transmitted from a user terminal at an unknown distance from the base station. Because of time-of-flight considerations, the user terminal time base is delayed relative to the base station. Furthermore, its CR transmission is also delayed because its timing advance is not yet initialized. Shortening the CR burst by 35 μsec allows it to arrive up to 35 μsec late without spilling over into the next time-slot. These 35 μsec mean that a user terminal 5300 meters from the base station can send a CR burst that will land completely within its time-slot. If this burst is seen by the base station, and replied to, the corresponding CM will contain a timing advance adjustment which will properly position subsequent data bursts.

Table 5 below summarizes the content of the example CR burst as shown in FIG. 6. The 82 information symbols are constructed from the configuration request message using modulation and coding.

TABLE 5

| Duration | Contents |
|---|---|
| 10 μsec | ramp-up |
| 260 μsec | training symbols $a_1, a_2, \ldots, a_{130}$ |
| 164 μsec | information symbols $h_1, h_2, \ldots, h_{82}$ |
| 10 μsec | ramp-down |
| 86 μsec | extra guard time |
| 15 μsec | inter-burst guard time |

CR spatial training is the same for all base stations and the base station does not necessarily know the location of the user terminal before receiving the CR. CRs are transmitted by user terminals at a fixed offset from BCH transmissions as shown in Table 3. The resulting time-multiplexed registration channel easily distinguishes CRs sent to different ones of several nearby base stations. Furthermore, CR and CM are scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register. Finally the smart antenna spatial resolution ability of the base station is applied to resolve any remaining ambiguities in received CRs.

A configuration request message is mapped onto a configuration request burst CR by the physical layer. A configuration message is mapped onto a standard downlink burst by the physical layer. The information symbols of the present CR burst are mapped out as shown in Table 6, below. Any of the items listed below can be deleted and transmitted later during the registration cycle or not at all based on the needs of the system.

TABLE 6

Configuration Request Message

| Field | # of Bits |
|---|---|
| identity | 8 |
| utClass | 4 |
| txPwr | 5 |
| Total | 17 | identity is a set of unique random bits for each user terminal that differentiate simultaneous messages from multiple user terminals. Because of the randomness and large number of bits, it is unlikely that two user terminals will select the same identity code at the same time.

utClass identifies user terminal capabilities (highest modulation class, frequency hopping capabilities, etc.) This sequence identifies the type of user terminal that sent the CR. A palmtop digital assistant might have different capabilities than a desktop computer with a fixed dedicated antenna. With utClass, the different capabilities can be distinguished.

txPwr represents the power used by the user terminal to transmit the Configuration Request burst. For example, user terminal power=(2·txPwr−30) dBm.

CR is sent on the control carrier, as an example, exactly 2265 μsec after receipt of a downlink BCH burst. In this way, an otherwise uninitialized user terminal can send CR without any knowledge of the frequency hopping sequence parameters. The CR burst is shorter than a standard uplink time-slot to allow for unknown time-of-flight from the user terminal to the base station and typically arrives late in the uplink time-slot receive window.

Configuration Message CM

Figure 7:
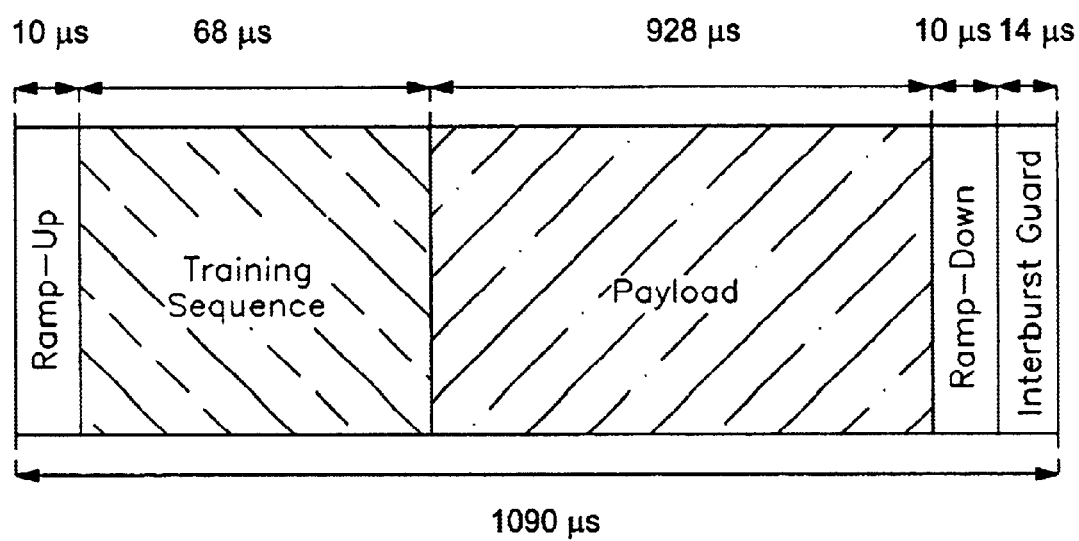
FIG. 7 is a diagram illustrating an example of a Configuration Message burst structure according to one embodiment of the present invention.

Table 7 below summarizes the content of an example Configuration Message burst as shown in FIG. 7. The 494 information symbols are constructed from the configuration message using modulation and coding.

TABLE 7

| Duration | Contents |
|---|---|
| 10 μsec | ramp-up |
| 68 μsec | training symbols $a_1, a_2, \ldots, a_{130}$ |
| 988 μsec | information symbols $h_1, h_2, \ldots, h_{494}$ |
| 10 μsec | ramp-down |
| 15 μsec | inter-burst guard time |

The configuration message CM burst is sent on the BCH carrier, exactly 5 μsec after sending a downlink BCH burst, whenever CR was received on the corresponding uplink time-slot. Using this timing, CM is directed to the requesting user terminal. CM is also sent in a spatially directed signal based on the analysis of the spatial signaure, for example parameters, such as DOA and TOA of the uplink CR. Since CM is sent on the BCH carrier, a fixed time offset from BCH, an otherwise uninitialized user terminal can receive CM without any knowledge of the frequency hopping sequence parameters. CM, in response to CR, includes, among other things; the AFN (Absolute Frame Number), a larger timing-advance adjustment dynamic range, coarser power control, and various access control parameters. Table 8, below summarizes the content of the CM burst as shown in FIG. 7. Any of the items listed below can be deleted and transmitted later during the registration cycle or not at all based on the needs of the system.

TABLE 8

Configuration Message

| Field | # of Bits |
|---|---|
| identity | 8 |
| pwrCtrl | 4 |
| timingAdjust | 7 |
| AFN | 10 |
| carrierMask | 16 |
| racarrierMask | 16 |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: offset=(2·pwrCtrl−16) dB. timingAdjust: timing advance that the user terminal should apply to future random access bursts: timing advance=timingAjust μs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are nonzero.

raDec: AFNs available for random access channels.

hopping: if equal to 1, the relationship between physical and logical carriers hops each frame.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 to 4, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data must be exchanged. Such systems include voice, video, music, broadcast and other types of data systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:

broadcasting a broadcast burst in a broadcast channel from a base station, the broadcast channel having at least one assigned frequency and a plurality of time slots, at least one time slot being assigned for the broadcast burst;

transmitting traffic in a tic channel from the base station, the traffic channel having a timed frequency hopping scheme, the hopped frequencies including the at least one broadcast channel frequency so that the traffic channel collides with the broadcast burst time slot;

broadcasting the broadcast burst in the traffic channel from the base station when the traffic channel collides with the broadcast burst time slot in the broadcast channel;

receiving a request for retransmission of traffic after the broadcast burst is broadcasted in the traffic channel due to a collision; and retransmitting the traffic in the traffic channel in response to the retransmission request.

2. The method of claim 1, wherein the retransmission request is received in an uplink channel from a remote terminal that is communicating traffic with the base station in the traffic channel.

3. The method of claim 1, wherein the broadcast channel is shared by a plurality of other base stations, each other base station being assigned to at least one of the plurality of time slots so that the traffic channel collides with slots assigned to be other base stations and wherein transmitting traffic in a traffic channel includes transmitting traffic when the traffic channel collides with a broadcast burst time slot assigned to any of the other base stations.

4. The method of claim 3, wherein broadcasting a broadcast burst further comprises broadcasting a broadcast burst with a predetermined timing that is synchronized at all base stations.

5. The method of claim 4, wherein the predetermined timing is based on a common timing reference received by each base station.

6. The method of claim 5, wherein the common timing reference is a satellite clock transmission received in a satellite receiver at each base station.

7. The method of claim 1, wherein broadcasting a broadcast burst further comprises broadcasting a frequency training sequence, a timing sequence, and a broadcast information sequence.

8. A machine-readable medium having stored thereon data representing sequences of instructions which, when executed by a machine, cause the machine to perform operations comprising:

broadcasting a broadcast burst in a broadcast channel from a base station, the broadcast channel having at least one assigned frequency and a plurality of time slots, at least one time slot being assigned for the broadcast burst;

transmitting traffic in a traffic channel from the base station, the traffic channel having a timed frequency hopping scheme, the hopped frequencies including the at least one broadcast channel frequency so that the traffic channel collides with the broadcast burst time slot;

broadcasting the broadcast burst in the traffic channel from the base station when the traffic channel collides with the broadcast burst time slot in the broadcast channel;

receiving a request for retransmission of traffic after the broadcast burst is broadcasted in the traffic channel due to a collision; and retransmitting the traffic in the traffic channel in response to the retransmission request.

9. The medium of claim 8, wherein the retansmission request is received in an uplink channel from a remote terminal that is communicating traffic with the base station in the traffic channel.

10. The medium of claim 8, wherein the broadcast channel is shared by a plurality of other base stations, the instructions causing the machine to perform thriller operations comprising assigning each other base station to at least one of the plurality of time slots so that the traffic channel collides with slots assigned to the other base stations and wherein the instructions for transmitting traffic in a traffic channel includes instructions causing the machine to perform operations comprising transmitting traffic when the traffic channel collides with a broadcast burst time slot assigned to any of the other base stations.

11. The medium of claim 10, wherein the instructions for broadcasting a broadcast burst further comprise instructions causing the machine to perform operations comprising broadcasting a broadcast burst with a predetermined timing that is synchronized at all base stations.

12. An apparatus comprising:

means for broadcasting a broadcast burst in a broadcast channel from a base station, the broadcast channel having at least one assigned frequency and a plurality of time slots, at least one time slot being assigned for the broadcast burst;

means for transmitting traffic in a traffic channel from the base station, the traffic channel having a timed frequency hopping scheme, the hopped frequencies including the at least one broadcast channel frequency so that the traffic channel collides with the broadcast burst time slot;

means for broadcasting the broadcast burst in the traffic channel from the base station when the traffic channel collides with the broadcast burst time slot in the broadcast channel;

means for receiving a request for retransmission of traffic after the broadcast burst is broadcasted in the traffic channel due to a collision; and means for retransmitting the traffic in the traffic channel in response to the retransmission request.

13. The apparatus of claim 12, wherein the retransmission request is received in an uplink channel from a remote terminal that is communicating traffic with the base station in the traffic channel.

14. The apparatus of claim 12, wherein the broadcast channel is shared by a plurality of other base stations, each other base station being assigned to at least one of the plurality of time slots so that the traffic channel collides with slots assigned to the other base stations and wherein the means for transmitting traffic in a traffic channel includes means for transmitting traffic when the traffic channel collides with a broadcast burst time slot assigned to any of the other base stations.

15. A method comprising:

receiving a broadcast burst in a broadcast channel from a base station, the broadcast channel having at least one assigned frequency and a plurality of time slots, at least one time slot being assigned for the broadcast burst;

receiving traffic in a traffic channel from the base station, the traffic channel having a timed frequency hopping scheme, the hopped frequencies including the at least one broadcast channel frequency so that the traffic channel collides with the broadcast burst time slot;

receiving the broadcast burst in the traffic channel from the base station when the traffic channel collides with the broadcast burst time slot of the broadcast channel;

requesting retransmission of traffic after the broadcast burst is received in the traffic channel due to a collision; and receiving the traffic in the traffic channel in response to the retransmission request.

16. The method of claim 15, wherein the broadcast channel is shared by a plurality of other base stations and further comprises a plurality of slots, each other base station being assigned to a slot so that the traffic channel collides with slots assigned to the other base stations and wherein receiving traffic in a traffic channel includes receiving traffic when the traffic channel collides with a broadcast burst time slot assigned to any of the other base stations.

17. The method of claim 16, wherein receiving a broadcast burst further comprises receiving a broadcast burst with a predetermined timing assigned that is synchronized at all base stations.

18. The method of claim 17, wherein the predetermined timing is based on a common timing reference received by each base station.

19. The method of claim 18, wherein the common timing reference is a satellite clock transmission received in a satellite receiver at each base station.

20. The method of claim 15, wherein receiving a broadcast burst further comprises receiving frequency training sequence, a timing sequence and a broadcast information sequence.

21. A machine-readable medium having stored thereon data representing sequences of instructions which, when executed by a machine, cause the machine to perform operations comprising:

receiving a broadcast burst in a broadcast channel from a base station, the broadcast channel having at least one assigned frequency and a plurality of time slots, at least one time slot being assigned for the broadcast burst, receiving traffic in a traffic channel from the base station, the traffic channel having a timed frequency hopping scheme, the hopped frequencies including the at least one broadcast channel frequency so that the traffic channel collides with the broadcast burst time slot;

receiving the broadcast burst in the traffic channel from the base station when the traffic channel Collides with the broadcast burst time slot of the broadcast channel, requesting retransmission of traffic after the broadcast burst is received in the traffic channel due to a collision; and receiving the traffic in the traffic channel in response to the retransmission request.

22. The medium of claim 21, wherein the broadcast channel is shared by a plurality of other base stations, the instructions causing the machine to perform further operations comprising assigning each other base station to at least one of the plurality of time slots so that the traffic channel collides with slots assigned to the other base stations and wherein the instructions for receiving traffic in a traffic channel includes instructions causing the machine to perform operations comprising receiving traffic when the traffic channel collides with a broadcast burst time slot assigned to any of the other base stations.

23. The medium of claim 21, wherein the instructions for receiving a broadcast burst further comprise instructions causing the machine to perform operations comprising receiving a broadcast burst with a predetermined timing assigned that is synchronized at all base stations.

24. An apparatus comprising:

means for receiving a broadcast burst in a broadcast channel from a base station, the broadcast channel having at least one assigned frequency and a plurality of time slots, at least One time slot being assigned for the broadcast burst;

means for receiving traffic in a tic channel from the base station, the traffic channel having a timed frequency hopping scheme, the hopped frequencies including the at least one broadcast channel frequency so that the traffic channel collides with the broadcast burst time slot;

means for receiving the broadcast burst in the traffic channel from the base station when the traffic channel collides with the broadcast burst time slot of the broadcast channel;

means for requesting retransmission of traffic after the broadcast burst is received in the traffic channel due to a collision; and means for receiving the traffic in the traffic channel in response to the retransmission request.

25. The apparatus of claim 24, wherein the broadcast channel is shared by a plurality of other base stations and further comprises a plurality of slots, each other base station being assigned to a slot so that the traffic channel collides with slots assigned to the other base stations and wherein the means for receiving traffic in a traffic channel includes means for receiving traffic when the traffic channel collides with a broadcast burst time slot assigned to any of the other base stations.

26. The apparatus of claim 24, wherein the means for receiving a broadcast burst further comprises means for receiving a broadcast burst with a predetermined timing assigned that is synchronized at all base stations.

27. A radio communications system comprising:

a broadcast channel for use by a base station having at least one assigned frequency and a plurality of time slots, at least one time slot being assigned for use in broadcasting a broadcast burst;

at least one traffic channel for use by the base station having a timed frequency hopping scheme, the hopped frequencies including the at least one broadcast channel frequency so that the traffic channel collides with the broadcast burst time slot; and an uplink channel to request retransmission of traffic received in the traffic channel with errors so that when the traffic channel collides with the broadcast burst time slot, traffic retransmission is requested.

28. The system of claim 27, wherein the base station transmits the broadcast burst in the broadcast channel if the traffic channel collides with the broadcast channel.

29. The system of claim 27, wherein the broadcast channel is shared by a plurality of other base stations and further comprises a plurality of slots, each other base station being assigned to a slot so that the traffic channel collides with slots assigned to the other base stations and wherein the base station transmits traffic when the traffic channel collides with a broadcast slot assigned to any of the other base stations.

30. The system of claim 29, further comprising a predetermined timing assigned to each slot, so that each slot is synchronized at all base stations.

31. The system of claim 30, wherein the predetermined timing is based on a common timing reference received by each base station.

32. The system of claim 31, wherein the common timing reference is a satellite clock transmission received in a satellite receiver at each base station.

33. The system of claim 27, wherein the broadcast message comprises a frequency training sequence, a timing sequence and a broadcast information sequence.

34. The system of claim 27, further comprising an uplink request channel having a plurality of slots to allow a user terminal to request a traffic channel, each slot of the uplink request channel having a timing relationship with the slots of the broadcast channel so that the timing relationship determines the base station to which the traffic channel request is directed.

* * * * *